United States Patent [19]

Miyake et al.

[11] Patent Number: 4,956,243
[45] Date of Patent: Sep. 11, 1990

[54] OPTICAL MEMORY ELEMENT

[75] Inventors: Tomoyuki Miyake, Tenri; Yoshiteru Murakami, Nishinomiya; Hiroyuki Katayama, Ikoma; Akira Takahashi; Kenji Ohta, both of Nara, all of Japan

[73] Assignee: Sharp Kabushiki Kaisha, Osaka, Japan

[21] Appl. No.: 9,211

[22] Filed: Jan. 30, 1987

[30] Foreign Application Priority Data

Jan. 31, 1986 [JP] Japan ................................. 61-20449

[51] Int. Cl.⁵ .............................................. G11B 7/00
[52] U.S. Cl. .................................. 428/694; 360/135; 369/13; 369/288; 428/900
[58] Field of Search .............. 428/694, 900; 365/123; 369/13, 288; 360/131, 134, 135; 430/945

[56]  References Cited

U.S. PATENT DOCUMENTS

| 4,270,132 | 5/1981 | Bell | 430/945 |
| 4,664,977 | 5/1987 | Osata et al. | 428/336 |
| 4,673,626 | 6/1987 | Takeda et al. | 428/201 |

FOREIGN PATENT DOCUMENTS

| 0139474 | 9/1984 | European Pat. Off. . |
| 59-54056 | 3/1984 | Japan . |
| 59-92449 | 5/1984 | Japan . |
| 60-195747 | 10/1985 | Japan . |
| 243842 | 12/1985 | Japan . |
| 2140406 | 4/1984 | United Kingdom . |

OTHER PUBLICATIONS

"CRC Handbook of Chemistry & Physics", 61st Edition, CRC Press, Inc., Boca Raton, Fla. 33931, 1981.

Primary Examiner—George F. Lesmes
Assistant Examiner—Dennis V. Carmen
Attorney, Agent, or Firm—Birch, Stewart, Kolasch & Birch

[57]  ABSTRACT

An optical memory element contains first and second reflector films, wherein the first reflector film is made of a material of a sufficiently large light reflectance in a relative sense as compared to the second reflector film, and the second reflector film being made of a material of a sufficiently small thermal conductivity in a relative sense as compared to the first reflector film.

13 Claims, 2 Drawing Sheets

OPTICAL MEMORY ELEMENT

BACKGROUND OF THE INVENTION

The present invention relates to an optical memory element which optically records, reproduces and/or erases information.

It is the recent trend in the field of information processing technology that greater magnetic memory capacity is strongly demanded as information is diversified and increases in volume. To meet this demand, an optical recording system using an optical recording medium has been developed and put into practical use, replacing the conventional recording system. However, an erasable and reloadable optical disc for practical use has not yet been realized at present and is expected to be developed in the immediate future.

There are various kinds of erasable and reloadable optical memories: one with a magneto-optical medium or based on the so-called magnetic Kerr effect, one based on the photo-darkening phenomenon of amorphous chalcogenide and one based on the light reflectance variation effected by the recording medium phase change. The most promising type among these is the system with a magneto-optical medium.

Some of the optical magnetic media used include earth metal-transition metal amorphous alloy. They are defective in that the Kerr rotation angle, which is vital for the signal reading performance, is small. A number of methods have been tried in an attempt to increase the magnetic force-rotation angle of a magneto-optical medium. One of them is to use a multi-layer film having a reflecting film structure thereby increasing the apparent Kerr rotation angle and improving the signal quality. In this method, a part of incident light is reflected by the magnetic film due to the result of the Kerr effect. The rest goes through the magnetic film and is reflected by the reflector film on the other side of the magnetic film back into the magnetic film due to the result of the Faraday effect in the magnetic film. The combination of the Faraday effect and the Kerr effect causes the apparent Kerr rotation angle of the total incident light to increase, thus raising the C/N ratio.

FIG. 2 is a structural drawing of the conventional magneto-optical disc, in which 1 is a glass or plastic plate, 2 is an AlN film, 3 is a GdTbFe film, 4 is an AlN film and 5 is an Al film.

In the magneto-optical disc of the above structure, the reflector film desirably has as large reflectance as possible. Therefore, Al, Cu, Au or Ag, which have a high reflectance in the semiconductor laser wavelength range, are used as reflector film materials. These elements, however, provide large thermal conductivity in general and therefore impair the recording sensitivity of the magneto-optical disc, since heat absorption by the reflector film during recording by laser is largely due to the high thermal conductivity of Al, larger laser power is required for recording, which inversely affects the recording sensitivity of the magneto-optical disc.

SUMMARY OF THE INVENTION

In view of the above, an object of the present invention is to provide an optical recording medium which uses a two-layer reflector film for better signal reproduction and higher recording sensitivity.

Another object of the present invention is to provide an optical memory element having a two-layer member as a laser-reflecting film which comprises a first layer of a sufficiently large light reflectance in relative sense and a second layer of a sufficiently small thermal conductivity in relative sense.

Other objects and further scope of applicability of the present invention will become apparent from the detailed description given hereinafter. It should be understood, however, that the detailed description and specific samples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, an optical memory element includes a first reflector film made of a material whose light reflectance is sufficiently large in relative sense, and a second reflector film formed on the first reflector film and made of a material whose thermal conductivity is sufficiently small in relative sense.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

As an embodiment of an optical memory element of the present invention, a magneto-optical disc is described below in detail with reference to the drawings.

Figure 1:
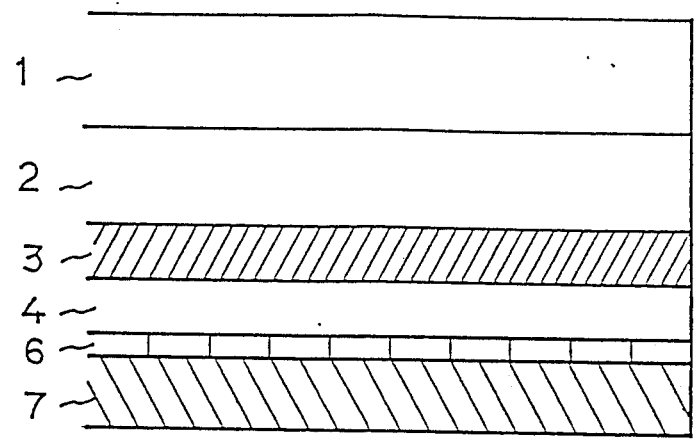
FIG. 1 is a sectional view of a magneto-optical recording medium of the present invention.
Figure 2:
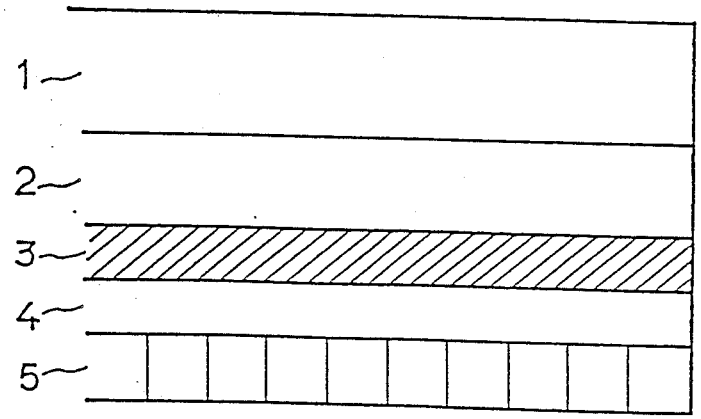
FIG. 2 is a sectional view of the conventional magneto-optical recording medium.

FIG. 1 shows the structure of the magneto-optical disc of the present invention.

Referring to FIG. 1, the magneto-optical disc comprises about 800 Å thick AlN film 2 as a first dielectric layer, about 200 Å thick GdTbFe film 3 as a magneto-optical recording medium, about 250 Å thick AlN film 4 as a second dielectric layer, about 100 Å thick Al film 6 as a first reflector film and about 500 Å thick Ni film 7 as a second reflector film all of which are formed in this order on a transparent substrate 1 made of a glass or plastic plate, whereby the apparent Kerr rotation angle is increased without deteriorating the recording sensitivity. Using Al with sufficiently large light reflectance in relative sense as the first layer of the reflector film, and Ni with sufficiently small thermal conductivity in relative sense as the second layer of the reflector film, the recording medium of the present invention can provide high reflectance and recording sensitivity that could not be attained by the conventional reflector film of single metal layer construction.

Figure 3:
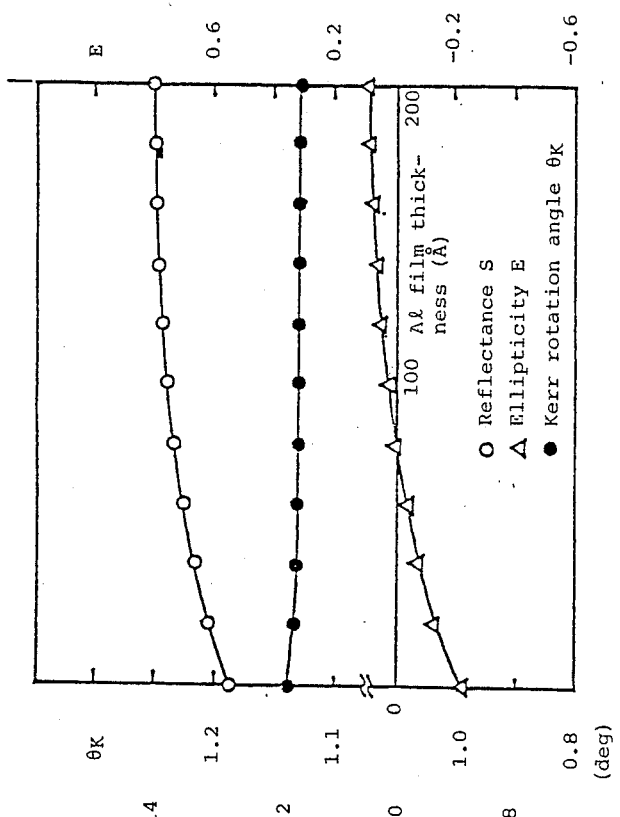
FIG. 3 is a graph showing Kerr rotation angle, reflectance and ellipticity for various Al film thicknesses.

FIG. 3 shows changes in the Kerr rotation angle, reflectance and ellipticity of the above-mentioned two-layer reflector film with the Al film thickness varying in the range between 0° and 200 Å and with the Ni film thickness fixed at about 500 Å. The graph shows that as the Al film thickness increases, optical effect of the Ni layer reduces, approaching that of an Al-single layer film. At about 100 Å thickness of Al film, the two-layer reflector film presents Kerr rotation angle of 1.1 degree, reflectance of 17% and ellipticity of 0.02, which are almost the same level as those of the Al single layer film. Since the Al layer which causes recording sensitivity deterioration is only 100 Å thick, the Ni layer whose thermal conducitivity is not higher than a half that of Al can constitute substantial portion of the reflector film.

The reflector film first layer made of Cu, Au, Ag or a like metal of high reflectance in combination with the second layer made of Th, Ta, Pb, Zr, Bi, Te, Se or a like metal of low thermal conductivity which can provide the same effect as the above embodiment. Since low thermal conductivity can be achieved by adding Ni to Al, the second layer of the reflector film may be made of two-element alloy such as AlNi instead of single element of Ni.

The first layer of the reflector film may also be any material of high reflectance such as cyanine type pigment, merocyanine pigment, dioxazine compound or the like in place of the above metal. The second layer of the reflector film may also be any material of low thermal conductivity in place of the above metal.

As understood from the above, the primary object of the present invention is to provide an optical recording medium with good signal reproduction characteristic and high recording sensitivity by employing the two-layer reflector film in the optical memory, and therefore, it is not intended that the materials for the first and second layers of the reflector film be limited to those introduced in the above description.

As appreciated from the above description, the reflector film of the present invention is superior to the conventional single-layer reflector film since it can improve the recording sensitivity of the optical disc without sacrificing light reflectance.

The transparent substrate 1 may be made of glass polycarbonate, acrylic or epoxy resin.

The optical magnetic recording medium 3 may be made of any material selected from rare earth metal-transition metal alloys; GdTbFeCo, GdTbFe, TbFe and TbFeCo are examples.

The first and second dielectric films 2 and 4 may be made of AlN, SiN, ZnN, SiO or SiO$_2$.

The thickness of each layer and the construction of the magneto-optical disc of the present invention are not limited to those presented in the above embodiment.

Due to the low thermal conductivity of the material used for the second layer of the reflector film, the present invention minimizes heat loss during recording by laser, thus saving laser power.

According to an embodiment of the present invention, an optical memory element includes a first reflector film made of a material whose light reflectance is sufficiently large in relative sense, and a second reflector film formed on the first reflector film and made of a material whose thermal conductivity is sufficiently small in relative sense.

While only certain embodiments of the present invention have been described, it will be apparent to those skilled in the art that various changes and modifications may be made without departing from the spirit and scope of the present invention as claimed.

What is claimed is:

1. A magneto-optical memory element comprising:
   a substrate;
   a magneto-optical recording medium film formed on said substrate; and
   a reflector film having first and second reflector layers, wherein said first reflector layer is formed on said recording medium and comprises a material of a higher optical reflectance in a relative sense than said second reflector layer, and wherein said second reflector layer is formed on said first reflector layer and comprises a material of a smaller thermal conductivity in a relative sense than said first reflector layer, and wherein said second reflector layer comprises a material of low thermal conductivity selected from the group consisting of Ni, Th, Ta, Pb, Zr, Bi, Te, Se and AlNi alloy.

2. The magneto-optical memory element of claim 1, further comprising a dielectric film formed at least between said substrate and said magneto-optical recording medium film or between said recording medium film and said reflector film.

3. The magneto-optical memory element of claim 1, further comprising:
   a first dielectric film formed between said substrate and said magneto-optical recording medium; and
   a second dielectric film formed between said recording medium and said first reflector layer.

4. The magneto-optical memory element of claim 3, wherein said first reflector layer comprises a material of high reflectance selected from the group consisting of Al, Cu, Au, Ag, cyanine type pigment, merocyanine pigment, and dioxazine; and wherein said second reflector layer comprises a material of low thermal conductivity selected from the group consisting of Ni, Th, Ta, Pb, Zr, Bi, Te, Se and AlNi alloy.

5. The magneto-optical memory element of claim 4, wherein said substrate comprises glass, polycarbonate, acrylic, or epoxy resin; said magneto-optical recording medium comprises a rare earth metal-transition metal alloy selected from the group consisting of GdTbFe, GdTbFeCo, TbFe and TbFeCo; and said first and second dielectric films comprise AlN, SiN, ZnN, SiO, or SiO$_2$.

6. The magneto-optical memory element of claim 3, wherein said first reflector layer comprises Al and said second reflector layer comprises Ni.

7. The magneto-optical memory element of claim 3, wherein said substrate comprises glass, polycarbonate, acrylic, or epoxy resin; said magneto-optical recording medium comprises a rare earth metal-transition metal alloy selected from the group consisting of GdTbFe, GdTbFeCo, TbFe and TbFeCo; and said first and second dielectric films comprises AlN, SiN, ZnN, SiO, or SiO$_2$.

8. The magneto-optical memory element of claim 3, wherein said magneto-optical recording medium comprises GdTbFe, said first and second dielectric layers comprise AlN, said first reflector layer comprises Al, and said second reflector layer comprises Ni.

9. The magneto-optical memory element of claim 8, wherein said first dielectric layer has a thickness of about 800 angstroms, said magneto-optical recording medium has a thickness of about 200 angstroms, said second dielectric layer has a thickness of about 250 angstroms, said first reflector layer has a thickness of about 100 angstroms and said second reflector layer has a thickness of about 500 angstroms.

10. The magneto-optical memory element of claim 1, wherein said first reflector layer comprises a material of high reflectance selected from the group consisting of Al, Cu, Au, Ag, cyanine type pigment, merocyanine pigment and dioxazine.

11. The magneto-optical memory element of claim 10, wherein said second reflector layer comprises a material of low thermal conductivity selected from the group consisting of Ni, Th, Ta, Pb, Zr, Bi, Te, Se and AlNi alloy.

12. The magneto-optical memory element of claim 1, wherein said first reflector layer comprises Al and said second reflector layer comprises Ni.

13. The magneto-optical memory element of claim 1, wherein said substrate comprises glass, polycarbonate, acrylic, or epoxy resin; said magneto-optical recording medium comprises a rare earth metal-transition metal alloy selected from the group consisting of GdTbFe, GdTbFeCo, TbFe and TbFeCo; and said first and second dielectric films comprises AlN, SiN, ZnN, SiO, or $SiO_2$.

* * * * *